(12) United States Patent
Glen

(10) Patent No.: US 9,325,929 B2
(45) Date of Patent: Apr. 26, 2016

(54) POWER MANAGEMENT IN MULTI-STREAM AUDIO/VIDEO DEVICES

(75) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 321 days.

(21) Appl. No.: 12/770,309

(22) Filed: Apr. 29, 2010

(65) Prior Publication Data

US 2011/0268425 A1    Nov. 3, 2011

(51) Int. Cl.

| | |
|---|---|
| *H04N 5/93* | (2006.01) |
| *H04N 5/63* | (2006.01) |
| *H04N 5/50* | (2006.01) |
| *H04N 21/426* | (2011.01) |
| *H04N 21/432* | (2011.01) |
| *H04N 21/443* | (2011.01) |
| *H04N 19/172* | (2014.01) |
| *H04N 19/127* | (2014.01) |
| *H04N 19/132* | (2014.01) |
| *H04N 19/162* | (2014.01) |
| *H04N 19/44* | (2014.01) |
| *H04N 5/45* | (2011.01) |

(52) U.S. Cl.
CPC ............... *H04N 5/63* (2013.01); *H04N 19/127* (2014.11); *H04N 19/132* (2014.11); *H04N 19/162* (2014.11); *H04N 19/172* (2014.11); *H04N 19/44* (2014.11); *H04N 21/42607* (2013.01); *H04N 21/42646* (2013.01); *H04N 21/4325* (2013.01); *H04N 21/4436* (2013.01); *H04N 5/45* (2013.01)

(58) Field of Classification Search
None
See application file for complete search history.

(56) References Cited

U.S. PATENT DOCUMENTS

| | | | | |
|---|---|---|---|---|
| 6,553,501 | B1 * | 4/2003 | Yokoe | 713/320 |
| 7,239,310 | B2 * | 7/2007 | Iinuma | 345/211 |
| RE41,482 | E  * | 8/2010 | Oh | 348/730 |
| 8,085,858 | B2 * | 12/2011 | Lida et al. | 375/257 |
| 8,139,887 | B2 * | 3/2012 | Kobayashi | 382/260 |
| 8,429,440 | B2 * | 4/2013 | Kobayashi | 713/600 |
| 2006/0152629 | A1 * | 7/2006 | Hirotani et al. | 348/565 |
| 2007/0110105 | A1 * | 5/2007 | Usuki et al. | 370/487 |

OTHER PUBLICATIONS

"White paper Blu-ray Disc Format: 2.B Audio Visual Application Format Specifications for BD-ROM," Blu-ray Disc Association, Mar. 2005, pp. 1-35.

* cited by examiner

*Primary Examiner* — Heather Jones
(74) *Attorney, Agent, or Firm* — Faegre Baker Daniels LLP

(57) ABSTRACT

A method of managing power consumption in a video device capable of displaying encoded multi-stream video is disclosed. Power reduction is achieved by limiting the amount of video and audio decoding and processing performed on at least some of the encoded streams, by taking particular application contexts into account. In a normal power consumption mode, audio/video data from all streams are decoded and digitally processed for output. In response to detecting a reduced power consumption mode, audio/video from at least some of the streams are processed in a modified manner to reduce power consumption.

20 Claims, 10 Drawing Sheets

POWER MANAGEMENT IN MULTI-STREAM AUDIO/VIDEO DEVICES

FIELD OF THE INVENTION

The present invention relates generally to power saving techniques in electronic circuits, and more particularly to power reduction methods suited for digital devices that are operable to process multi-stream content.

BACKGROUND OF THE INVENTION

Power consumption is a critical design constraint in many electronic devices. This is especially true of mobile devices that are usually operated using supplied DC power. Such electronic devices often contain integrated circuits that process information digitally and consume appreciable amounts of power during operation. Most dynamic power consumption in portable electronic devices such as video players occurs when their digital circuitry is actively switching, such as when decoding compressed video data to display motion video to interconnected displays.

Numerous formats suitable for organizing digital data for easy storage and convenient playback exist. In particular, digital video may be distributed using storage formats such as those used in the popular DVD format or newer, higher resolution formats such as Blu-ray. They may alternatively be streamed over a data network. Compressed video formats employed in DVDs, which are still widely available, store video in standard definition (SD) resolution. However, the newer formats which are becoming increasingly popular and are being incorporated into current and the next generation of consumer electronic devices, encode video in high definition (HD) resolution.

For example, Blu-ray supports a high definition primary video stream, a secondary video stream, two independent HD graphics streams, several audio tracks, and a background stream. These streams are used to provide improved menu interfaces, subtitles and other features that enhance user experience.

However, the improved quality and feature set listed above necessitate encoding substantial additional digital data onto a Blu-ray disc (BD). Decoding BD content would therefore require extra decoding and processing steps by decoder hardware in order to display the encoded HD video and audio content, and to provide additional features and improvements. Unfortunately, this would entail increased power consumption by the decoder hardware during playback.

Conventional power reduction techniques often emphasize optimizations at the physical circuit level, such as using lower frequency clock signal inputs, shutting down portions of a digital circuit, or reducing the supply voltage, in order to conserve power. Such techniques therefore treat many types of circuits including video decoders, generic microprocessors, memory controllers and others in essentially the same fashion and although each circuit may be geared towards different purposes.

Conventional techniques may thus fail to deliver adequate power reduction since they do not take particular application contexts into account. Accordingly, there is a need for improved power conservation techniques suitable for digital audio/video devices such as BD players.

SUMMARY OF THE INVENTION

In accordance with one aspect of the present invention, there is provided a method of processing a plurality of digital audio/video streams at an audio/video device to output audio/video in one of at least two power consumption modes. In a first normal power consumption mode, the method involves digitally processing at least a first and second one of the digital streams; and detecting a desired reduced power consumption mode for operating the device. In response to detecting a reduced power consumption mode, the method involves selecting a modified manner to digitally process the second one of the digital streams, digitally processing the first one the streams in the same manner as in normal mode, and digitally processing the second one of the digital streams in the selected modified manner in order to reduce dynamic power consumed by the device as a result of digitally processing the second stream.

In accordance with another aspect of the present invention, there is provided a method of operating a computing device to playback of a video stream and an audio stream from a source. The method includes decoding video frames from the video stream. In a normal power consumption mode, the method involves compositing corresponding ones of the video frames from the video stream with other applications in the device to form output images and displaying the output images onto a display while decoding and outputting the audio stream. In response to detecting a reduced power consumption mode, the method involves maximizing and outputting the video frames in full screen exclusive mode, so as to block the other applications from presenting on the display, while decoding and outputting the audio stream in the same manner as in the normal mode.

In accordance with another aspect of the present invention, there is provided a method of operating a computing device to playback of a plurality of video streams from a source. The device includes a processing engine, memory storing processor executable instructions in communication with the engine and an output interface interconnected to a display. The method includes, in a normal power consumption mode, decoding at least a first stream and second stream, forming video frames from the second stream, and digitally processing the video frames using a first algorithm. The method also includes, in response to detecting a reduced power consumption mode, digitally processing the video frames using a second algorithm that is computationally simpler than the first algorithm, while digitally processing the first stream in the same manner as in the normal mode.

In accordance with another aspect of the present invention, there is provided a video player device operable in at least two power consumption modes, for digitally processing and outputting a plurality of audio/video streams. The device includes a drive for reading a medium containing the streams; and a processing engine in communication with memory and the drive. The memory contains processor executable instructions for decoding and processing the streams. In a first normal power consumption mode, the device digitally processes at least a first and a second one of the plurality of streams to form and output audio/video content; and in response to detecting a desired second reduced power consumption mode, the device selects a modified manner to digitally process the second one of the streams and digitally processes the second one of the streams in the modified manner, in order to reduce dynamic power consumed by the device as a result of digitally processing the second one of the plurality of streams, while digitally processing the first one of the plurality of streams in the same manner as in the normal power consumption mode.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Devices that process and present multi stream video and audio data are becoming common place. Similarly, devices that support so-called high definition resolution video (1920× 1080 or 1280×720 pixels) are emerging. In the future even higher resolutions may be common place. Currently, Blu-ray standard compliant players support a main or primary video stream along with auxiliary streams including a secondary video stream, a background stream, a presentation graphics (PG) stream and an interactive graphics (IG) stream. In Blu-ray, the primary video stream is of a high definition resolution (1920×1080). Two independent graphics streams (i.e., the IG and the PG streams) are used to provide menus, buttons, subtitles, animation and the like. In addition, auxiliary streams such as the secondary video stream in Blu-ray may be used for director's commentary. Similarly, Blu-ray supports multiple audio streams, which may provide audio in varying audio formats, resolutions, channels, languages, and content. Other standards that support multiple audio and video streams include the integrated services digital broadcasting standards (ISDB) supported in Japan and elsewhere.

High definition video and associated audio may be stored on an optical Blu-ray disc (BD) in compliance with one of several formats such as the BD-recordable (BD-RE), BD-prerecorded or BD-read-only-memory (BD-ROM) and BD-write-once (BD-R) formats. BD-ROMs may often be used to distribute movies, music videos and the like in high definition video and surround-sound audio and including subtitles and other features.

A compliant video player, in turn, can decode each stream of video/audio data and provide decoded video/audio signals to interconnected output devices such as a display, an audio amplifier or speaker, or the like.

More specifics about Blu-ray may be found in Blu-ray Disc Format Specifications including for example, the Blu-ray Disc Read-Only (ROM) Format Version 2.0 defined in May of 2006.

Figure 1:
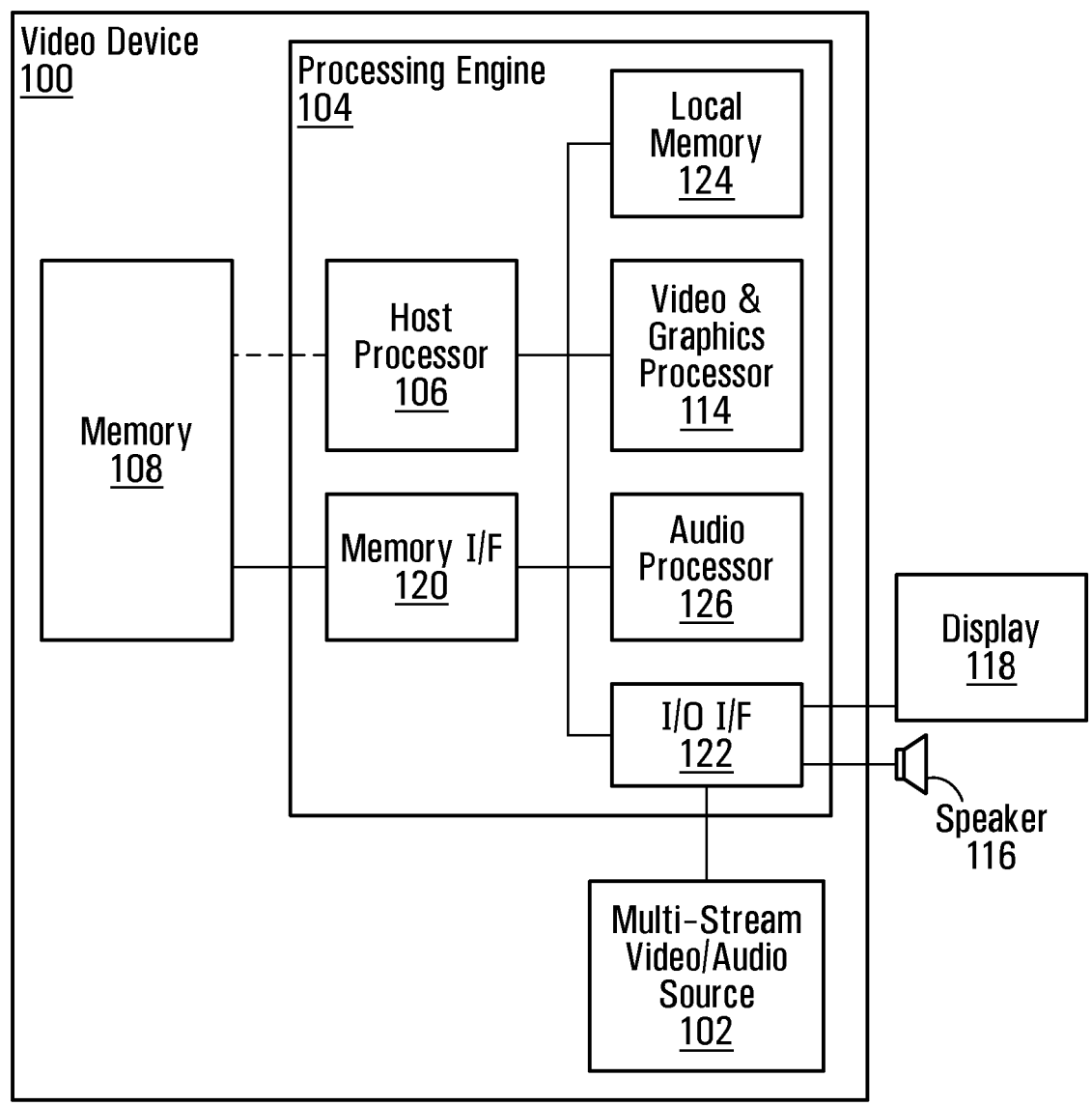
FIG. 1 is a schematic block diagram of a digital video player, interconnected to a speaker and a display.

FIG. 1 illustrates a simplified block diagram of a video player device 100, exemplary of an embodiment of the present invention. Device 100 includes a processing engine 104 that includes a host processor 106, a memory interface circuit 120, and a video and graphics processor 114. Video and graphics processor 114 may have its own local memory 124. Processing engine 104 may further include an audio processor 126, and an input-output (I/O) interface circuit 122. Memory interface circuit 120 may provide processing engine 104 with a control interface to computer readable memory 108. I/O interface circuit 122 may provide a number of standard I/O interfaces to processing engine 104, including for example peripheral, video and audio interfaces, such as HDMI, S-Video, component video, DisplayPort™ interfaces. SATA, or USB interfaces, multichannel audio interfaces, and the like. A multi-stream video/audio source 102 may be in communication with processing engine 104 and audio processor 126 through interface circuit 122. Processing engine 104 may also be interconnected with computer readable memory 108 by way of an internal memory interface circuit (not shown). A speaker 116 may be attached to audio processor 126 through I/O interface circuit 122 and be used to output video and audio.

Multi-stream video/audio source 102 may be a memory with suitable reader—such as an optical BD and drive; it may be a cable or terrestrial television tuner; or it may simply be logic capable of downloading or streaming multi-stream video/audio from a communications network.

Suitable software causing device 100 to decode audio/ video and operate in manners exemplary of embodiments of the present invention may be stored in system memory 108. Processor executable instructions specific to host processor 106, video and graphics processor 114 and audio processor 126 may be loaded into memory 108, and read by processing engine 104. The instructions may be used by video and graphics processor 114 to carry out many image processing functions including video decoding, scaling, de-interlacing, image composition, chroma up-sampling and the like. Audio processor 126 may similarly perform audio decoding, audio encoding, re-sampling, mixing and the like. Host processor 106 may be used to manage device 100, and assist in some decoding phases such as de-multiplexing.

Display 118 may be an LCD panel, or the like. A display interface such as HDMI, VGA, DisplayPort, DVI or the like (not shown) may interconnect display 118 to processing engine 104.

In some embodiments device 100 may be a dedicated video player, such as a BD player capable of reading encoded digital video distributed using a BD; a high definition media player; a portable electronic device, such as cellular telephone, a personal digital assistant, a video game, or the like. In such embodiments, some components of FIG. 1 may be omitted or replaced with other similar functional blocks, formed in software, as firmware, hardware otherwise, in manners understood by those of ordinary skill.

In an exemplary embodiment, device 100 may, for example, take the form of a general purpose personal computer, such as a laptop computer or workstation, acting as a BD player. In such an embodiment, host processor 106 may be a central processing unit (CPU) with an AMD x86 based architecture. Source 102 may be an optical disc drive, loaded with a suitable storage medium such as a BD. Interface circuit 120 may be high speed peripheral interface—such as "the north bridge", while I/O interface circuit 122 may be a low speed peripheral interface—commonly called "the south bridge". Source 102 may be interconnected to I/O interface circuit 122 by way of a serial advanced technology attachment (SATA) bus or a similar suitable bus. Video and graphics processor 114 may be a graphics processing unit (GPU) formed on a Peripheral Component Interconnect Express (PCIe) graphics card or an integrated graphics processor (IGP) within processing engine 104.

In operation, a suitable source of audio video content provides multiple streams to device 100. In the depicted explanatory embodiment, multiple streams may be provided by stream source 102 in the form of an optical disc drive having a digital medium (e.g., BD) containing multi-stream audiovisual content loaded thereon. The optical drive may be capable of reading and transferring encoded data from the disc to processing engine 104 in device 100.

Each image constructed from the contents of a BD by device 100 may include video contained in the main (primary) video stream, and auxiliary streams such as a secondary video stream, the IG stream, the PG stream and a background stream. The primary and secondary video streams may, for example, be encoded in one of an MPEG-2, MPEG-4 AVC (or H.264) and SMPTE VC-1 compliant formats. The secondary video stream may be used for picture in picture (PiP) video. The PG stream may include encoded graphics objects, color look-up tables (GLUT) and other encoded data.

In normal operation, processing engine 104 in device 100 may decode the main video stream into main video frames (e.g., primary video frames), and each of the auxiliary streams into auxiliary frames (e.g., graphics overlay images or PiP secondary frames) containing corresponding images which may be combined (or composited) with the main frame to form final images for display, in accordance with Blu-ray Disc Format Specifications.

The IG stream may be used to provide menu graphic objects for commands associated with interactive displays during a movie presentation. The PG stream may be used to provide information required for non-interactive overlays that are supplemental to the primary video content such as for example, subtitles and animated graphics. In Blu-ray, the images in the IG and PG streams are independent of each other and also of the primary video stream. Both IG and PG streams may also include various wipes, fades and scroll effects. Composition segments within the IG and PG streams, indicate graphics objects to be used for a graphics display, and may define cropping transforms to be applied when compositing graphics objects. Composition segments also indicate a palette to be used for graphics displays. Effects such as wipes, scrolls and cuts can be realized by providing multiple compositions segments which change cropping areas of graphics objects.

Images from each stream are decoded, processed and subsequently composited together into output frames for display. Compositing typically involves alpha blending of two or more images. A frame from the main video stream may for example be overlaid with images decoded from the graphics streams. Final display frames or images are provided to display 118. Images to be composited may be mixtures of high definition resolution and standard definition. For interactive or feature-rich presentations, the display image may be formed from the superposition of corresponding frames from of the multiple streams.

To reduce power consumption in exemplary embodiments of the present invention, decoding methods may take into consideration, the data organization of audio/video streams as received from source 102. As will become apparent, different decoding, processing and/or compositing techniques may be utilized for at least one of the multiple streams, based on whether the device is operating in a normal power consumption mode, or in a reduced power consumption mode.

That is, all streams may be decoded, and digitally processed and displayed in a conventional manner when device 100 is operating in its normal power consumption mode. While in a reduced power consumption mode, some of the auxiliary streams may be digitally processed in a modified manner to reduce power consumption. That is, auxiliary streams may not be decoded, or may not be digitally processed, when in reduced power consumption mode. Alternatively, as will become apparent, the auxiliary streams may be partially decoded, or digitally processed using less computationally intensive algorithms.

The auxiliary streams that may not be decoded in reduced power consumption mode are, in some embodiments, selected by commands or controls (e.g., buttons, check boxes, etc.) by way of user interface software executing on processor 106. Additionally, the specifics of a reduced power consumption mode of device 100 may be pre-programmed by a manufacturer, or possibly set by user input. For example, a user may control via a user interface, which auxiliary streams are excluded from certain decoding and/or processing steps, or from a composition stage, when in a reduced power mode.

For example, in a BD player, a user may be particularly interested in the subtitles and hence may select to decode the presentation graphics stream while omitting the interactive graphics stream, or the background stream if any, when in a reduced power consumption mode.

Thus, in one exemplary embodiment of the present invention, in a reduced power consumption mode only video frames from the primary stream may be used to form display output image on display 118 while images decoded from the auxiliary streams are inhibited or suppressed. That is, the encoded auxiliary streams, may not be read and/or decoded from the medium (e.g., BD) at all, while each frame of the main (e.g., primary) video stream is read and decoded to form display image and displayed on to display 118. As may be appreciated, this may significantly reduce the computational demands on GPU 114, and processor 106 which in turn reduces power consumption in device 100.

Transition between operation of device 100 in its normal power consumption mode and its reduced power mode may be effected in numerous ways. For example, the transition may be triggered by manual user intervention (e.g. a switch, button or the like), or in response to sensing limited available power. In one embodiment, device 100 may be a portable, battery operated device such as a laptop computer. Processor 106 may monitor the battery level of device 100, and when the battery level is below a certain threshold, may place device 100 in a reduced power consumption mode. Alternately, processor 106 may monitor the power source, and transition device 100 to its reduced power consumption mode upon detecting device 100 is no longer interconnected with an AC source, such as the mains. Alternatively, processor 106 may compare the time remaining on currently playing content (e.g. a movie), with available playing time left at a normal power consumption rate given its current battery level. If processor 106 determines that device 100 would not be able to complete playback of the current track or movie presentation at its current normal rate of power consumption, processor 106 may place device 100 in a low power consumption mode to allow completion of the presentation.

When in reduced power consumption mode, processing engine 104 (or GPU 114) may only render frames from the primary video stream (main video stream) from stream source 102. Frames from auxiliary streams (e.g., graphics overlays) would thus not be composited for display. Of course, in normal power consumption mode, corresponding images from each stream may be combined and displayed.

Figure 2:
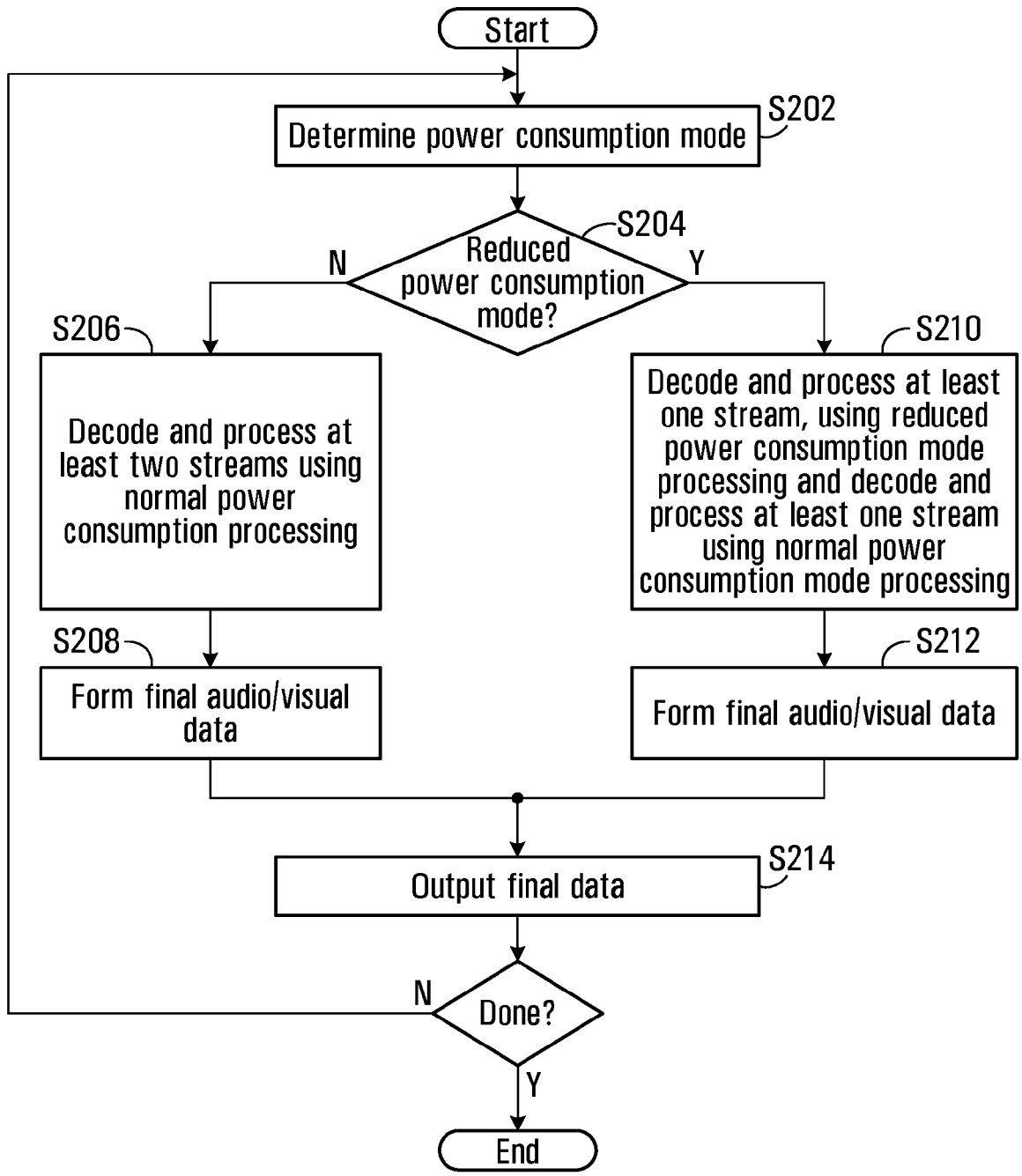
FIG. 2 is a flowchart generally depicting a method of decoding and displaying multi-stream audio/video using the device of FIG. 1, in an exemplary embodiment of present invention.

FIG. 2 illustrates a flowchart depicting steps taken by exemplary device 100 to decode and display frames from a multi-stream audio/video source (e.g., stream source 102) in an exemplary embodiment of the present invention. Of course, steps in FIG. 2 need only be performed in the presence of multiple streams. First, device 100 determines the power consumption mode (S202) based on for example, battery level. If device 100 determines that it should operate in a normal power consumption mode (S204) then it may decode and digitally process at least two streams (typically all active streams) using normal power consumption processing (S206). It may then output the final audio/video content (S208) formed using normal power consumption mode processing.

On the other hand, in response to detecting a desired reduced power consumption mode in S204, device 100 may decode and digitally process, at least one stream in normal power consumption mode; and at least one other stream in a modified manner—i.e., using reduced power consumption mode processing (S210). It may then form and output final audiovisual data (S212) formed using reduced power consumption mode processing. Final images may be output (S214) by device 100, and these steps may be repeated (S216) until all of the input data is processed.

Figure 3:
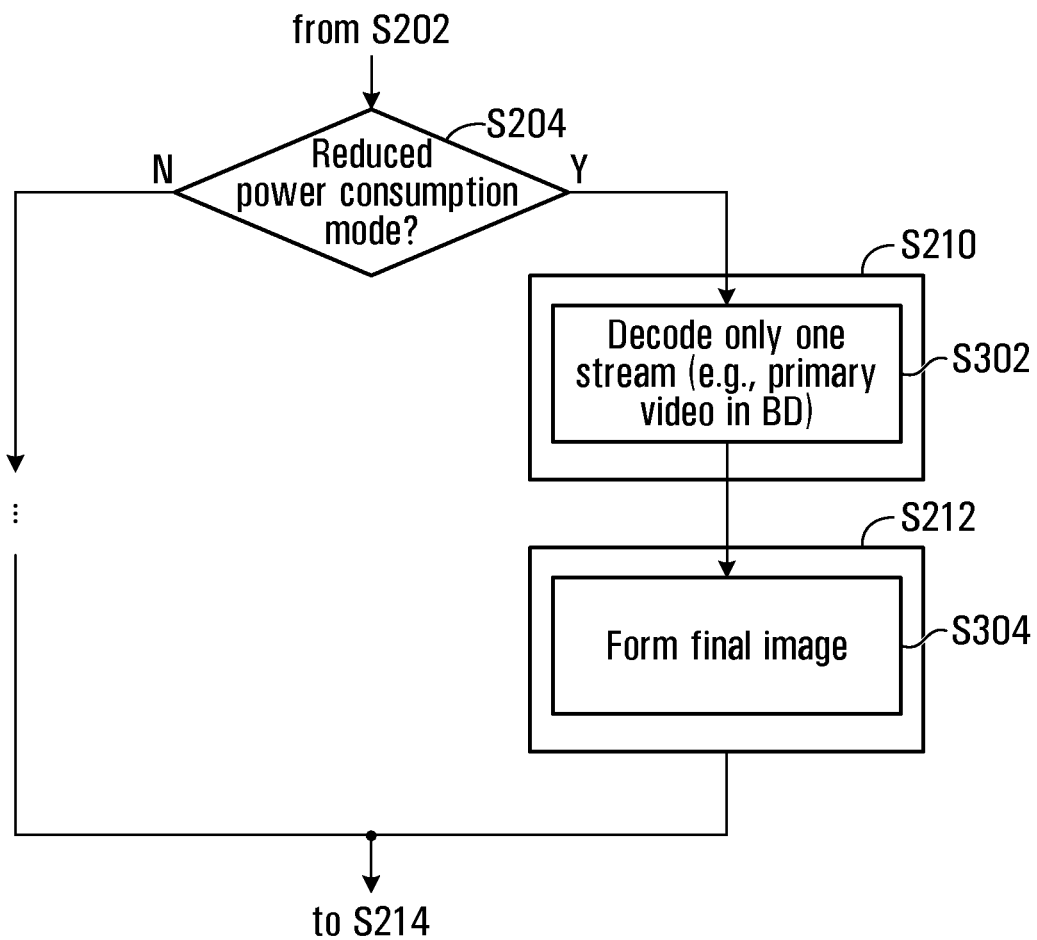
FIG. 3 is a flowchart depicting a particular method of decoding and displaying multi-stream audio/video using the device of FIG. 1, in an exemplary embodiment of present invention.

In one specific embodiment, video device 100 may operate to playback of a plurality of audio/video streams from a source (e.g., BD). The audio/video streams typically include at least a first stream (e.g., the primary video stream) and a second stream (e.g., the secondary video stream). As depicted in FIG. 3, during device operation, video frames from the primary stream are decoded. In normal power consumption mode, video frames or graphics images from the secondary stream may be decoded and combined with corresponding video frames from the first video stream to form output images. The secondary stream may for example be presented as a picture-in-picture video. Composited output images are then displayed on a display.

In response to detecting a reduced power consumption mode however, as depicted in FIG. 3, device 100 may only decode (S302) and form video frames (S304) from the primary stream in a modified manner, without combining them with video images from the secondary stream. In reduced power consumption mode, decoding and processing of the secondary stream may thus be inhibited.

Figure 4:
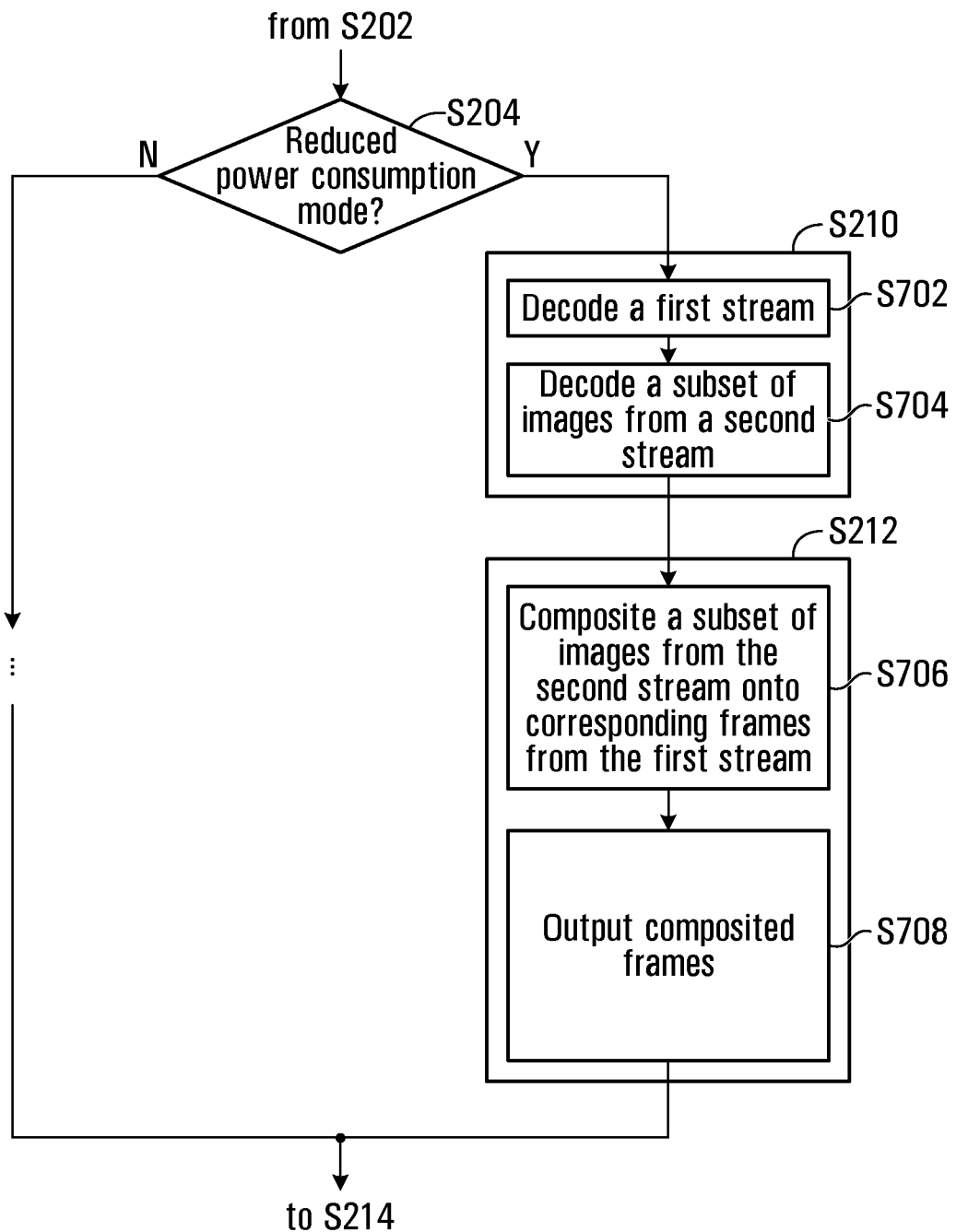
FIG. 4 is a flowchart that depicts the actions of an exemplary processing circuit, in which main frames are decoded and displayed at a full frame rate, while auxiliary frame rates are composited at a reduced frame, rate when in reduced power consumption mode.

In another exemplary embodiment, device 100 or its processing engine 104 may decode, process, and display some input streams at different rates. For example, in normal power consumption mode, processing engine 104 may decode and composite all corresponding images from each of the input video streams, and display the composited frames. In a reduced power consumption mode however, as depicted in FIG. 4, device 100 may decode all images from a first stream (S702) and but only a subset of images from a second (e.g., overlay) stream (S704) received from a stream source (e.g., stream source 102). Processing engine 104 may thus composite the subset of images decoded from the second stream onto corresponding images from the first stream (S706) and output the composited images (S708).

In a normal power consumption mode, processing engine 104 may composite and display decoded images from both the first (e.g., primary) video stream and the auxiliary (e.g., presentation graphics) stream at the full frame rate (e.g., 30 Hz). In a reduced power consumption mode however, processing engine 104 may decode every other encoded auxiliary image, and composite each decoded auxiliary image with one or more corresponding main (primary) frames. Thus, processing engine 104 may display one primary video frame composited with an auxiliary image (e.g., presentation graphics image), followed by another primary video frame composited with the same auxiliary image.

Figure 5:
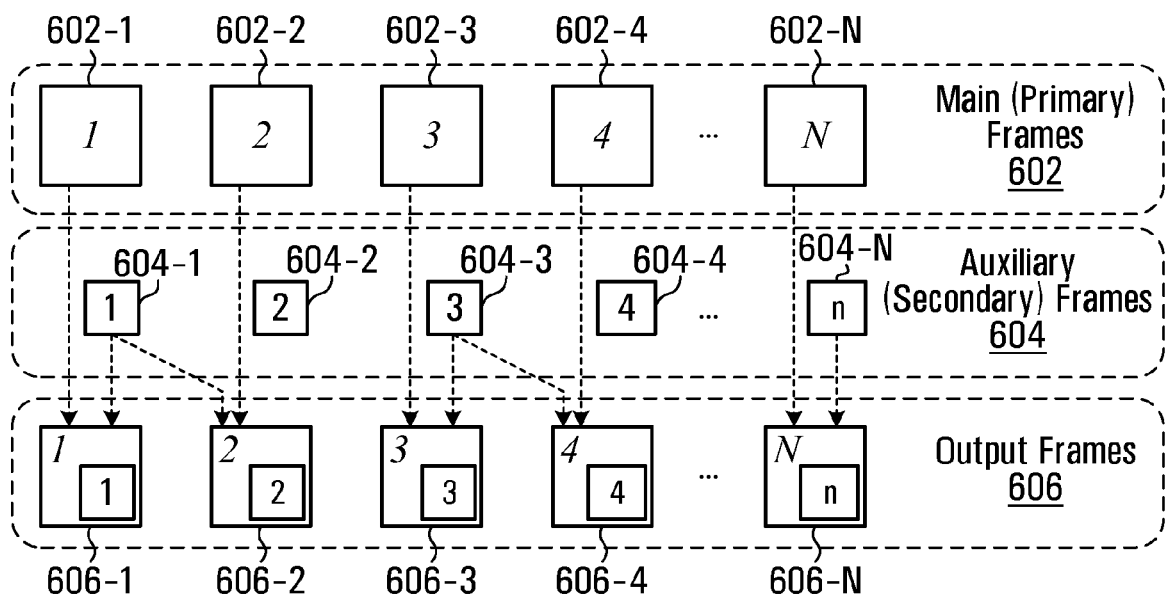
FIG. 5 is a schematic depiction of selective composition of frames of an auxiliary stream with corresponding frames of a main video stream.

FIG. 5 schematically illustrates one such composition of decoded images from multiple video streams. As depicted, the main or primary stream includes frames 602-1, 602-2, 602-3, . . . 602-N (individually and collectively frames 602), while an auxiliary stream (e.g., the presentation graphics stream) includes corresponding images 604-1, 604-2, 604-3, . . . 604-N (individually and collectively images 604). In normal power consumption mode, each image in the secondary stream may be decoded and composited with a corresponding frame from the primary stream and presented. However, in a reduced power consumption mode, every other image from the secondary stream may be decoded. That is, only image 604-1, 604-2 . . . 604-N may be decoded. After decoding, composition is performed as depicted to form output frames 606-1, 606-2, 606-3 . . . 606-N (individually and collectively output frames 606). Output frame 606-1 is formed by compositing corresponding main frame 602-1 and secondary stream image 604-1. However, output frame 606-2 is formed by compositing frame 602-2 and image 604-1 (as image 604-2 is not decoded in a reduced power consumption mode). Output frame 606-3 (like frame 606-1) is formed by compositing corresponding primary frame 602-3 and image 604-3 while output frame 606-4 is formed by compositing frame 602-4 and image 604-3 (as image 604-4 is not decoded). Finally output frame 606-N is formed by compositing frame 602-N and image 604-N.

Figure 6:
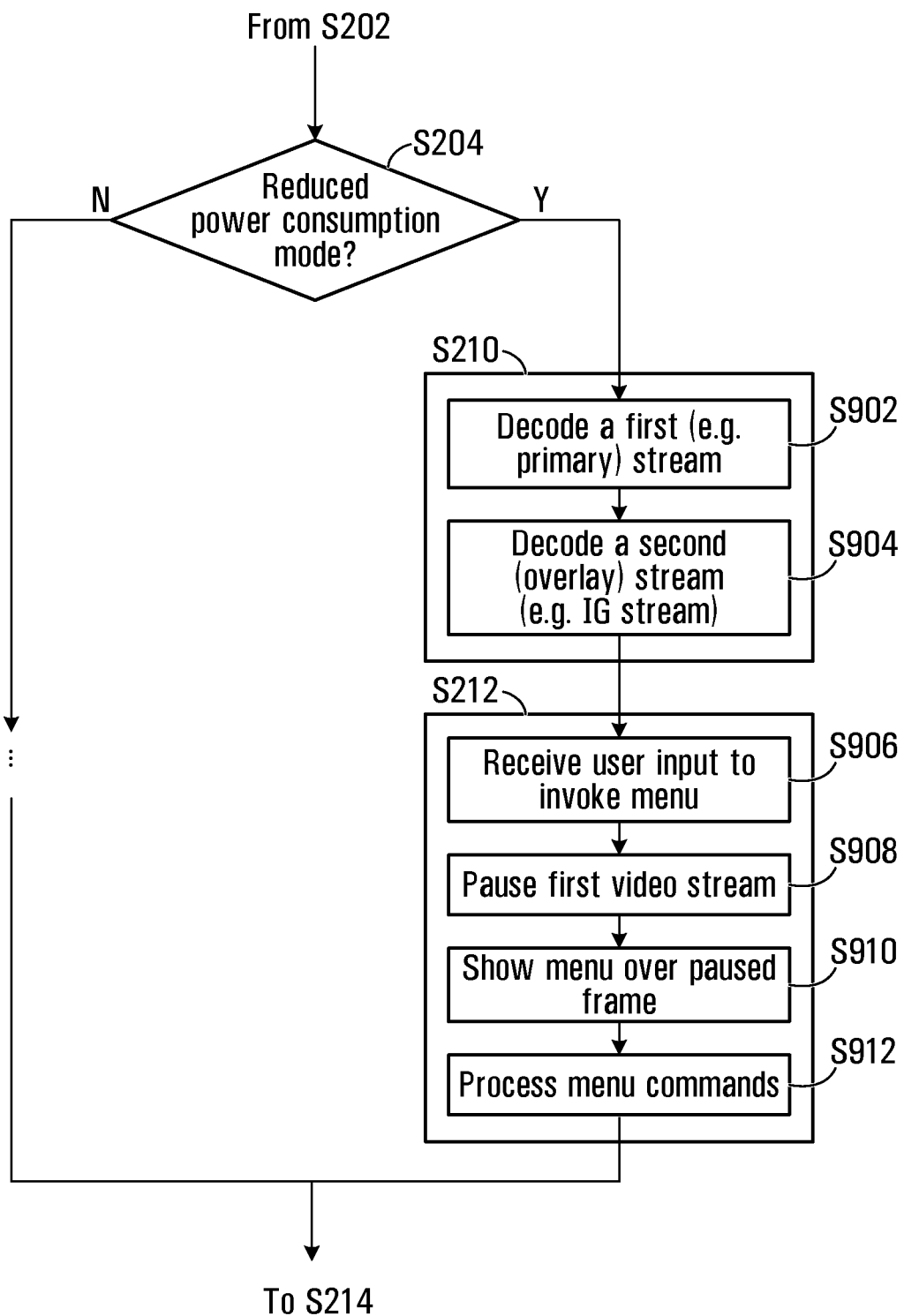
FIG. 6 is a flowchart of the actions of an exemplary device processing multi-stream video, while a menu is being displayed.

In yet another variation, processing engine 104 may pause displaying video from one stream altogether, whenever an interactive graphics frame (e.g., menu) is displayed. As depicted FIG. 6, device 100 (or specifically processing engine 104) may decode a first interactive graphics (IG) stream (for menus) (S904) and a second video stream to display video frames (S902). Device 100 may receive a user input to display a menu (S906). In normal power consumption mode, a decoded interactive graphics image from the first stream may be used to present a menu for interaction with a viewer, while the video stream continues to be decoded and displayed in the background. However, upon determining a reduced power consumption mode (S204), the second (video) stream may be paused, and menus or buttons, the interactive graphics image may be displayed over a paused (i.e., static) current video frame (S908, S910). That is, in a reduced power consumption mode, the video stream would not be playing while the menu is displayed and consequently power consumption can be reduced. In either power consumption case, user command input via the displayed menu (i.e., interactive graphics stream) may be received and processed (S912). The process may be repeated until the streams are decoded and displayed. In a variation of this embodiment, device 100 may stop (rather than pause) the playback of the primary video entirely, so that composition with the primary video frame is not required when presenting a menu in a reduced power consumption mode.

Figure 7:
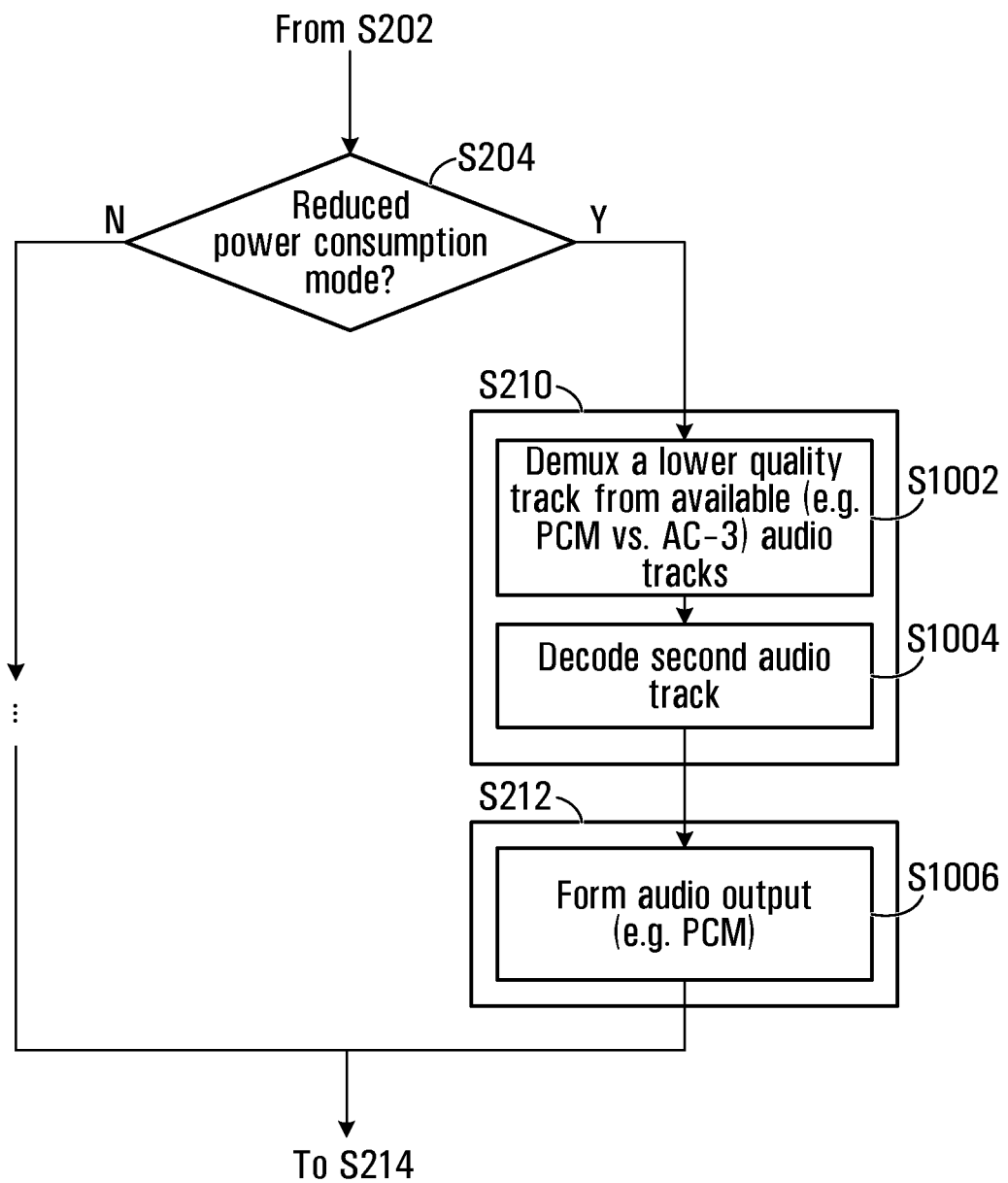
FIG. 7 is a flowchart of the actions of an exemplary device when processing multi-stream audio.

In another embodiment, audio decoding and outputting may be selectively performed as described below using the flowchart depicted in FIG. 7 to conserve power. An audio source (e.g., a BD) may present several audio tracks including for example, PCM encoded audio, Dolby Digital (AC-3) encoded surround sound audio, DTS encoded surround sound audio and the like. PCM encoded audio may have up to 8 channels encoded at a sample rate of 48 KHz or 96 KHz, with 16, 20, or 24 bits per sample. To conserver power, processing engine 104 may decode only a subset of the available audio data; or if multiple audio tracks are available, decode a lower quality audio track requiring less power to process. For example, processing engine 104 may decode and output a first track in one format (e.g., DTS) when in normal consumption mode. However, to conserve power, processing engine 104 may select a lower quality track (S1002) in a second format (e.g., PCM encoded audio) and decode (S1004) and form an audio output (S1004) upon detecting a reduced power consumption mode.

In addition, only a subset of the channels of a PCM encoded audio (e.g., 4 out of 8 channels) may be decoded for output in order to conserve power. In addition PCM audio encoded at a rate of 96 KHz, may be sub-sampled down to 48 KHz prior to output to conserve power.

In some embodiments, the first and second streams being decoded by device 100 may both be audio streams. For example, in a Blu-ray disc, device 100 may present both the audio track of a primary video, and the director's commentary in a secondary audio and video, together with the primary audio track. The director's commentary may of course be suppressed, or otherwise processed in a modified manner to conserve power, as needed.

In another embodiment, multichannel audio, such as Dolby Digital or DTS encoded surround sound audio may be decoded for playback on fewer speakers than the number of encoded audio channels. Here, processing engine 104, may down-mix the multichannel audio input (e.g. six channels for 5.1 surround sound) into fewer channels corresponding to the number of speakers desired (e.g., two speakers). Down-mixing may be used by processing engine 104, when in normal power consumption mode. However, in a reduced power consumption mode, processing engine 104 may simply select and output the desired number of channels (e.g., front left and front right channels only) to interconnected speakers to reduce computation and hence power consumption. Of course various down-mixing options are available to output 5.1, 7.1 or 10.1 encoded multichannel sources to 2.1 or 2 channel output systems.

Figure 8:
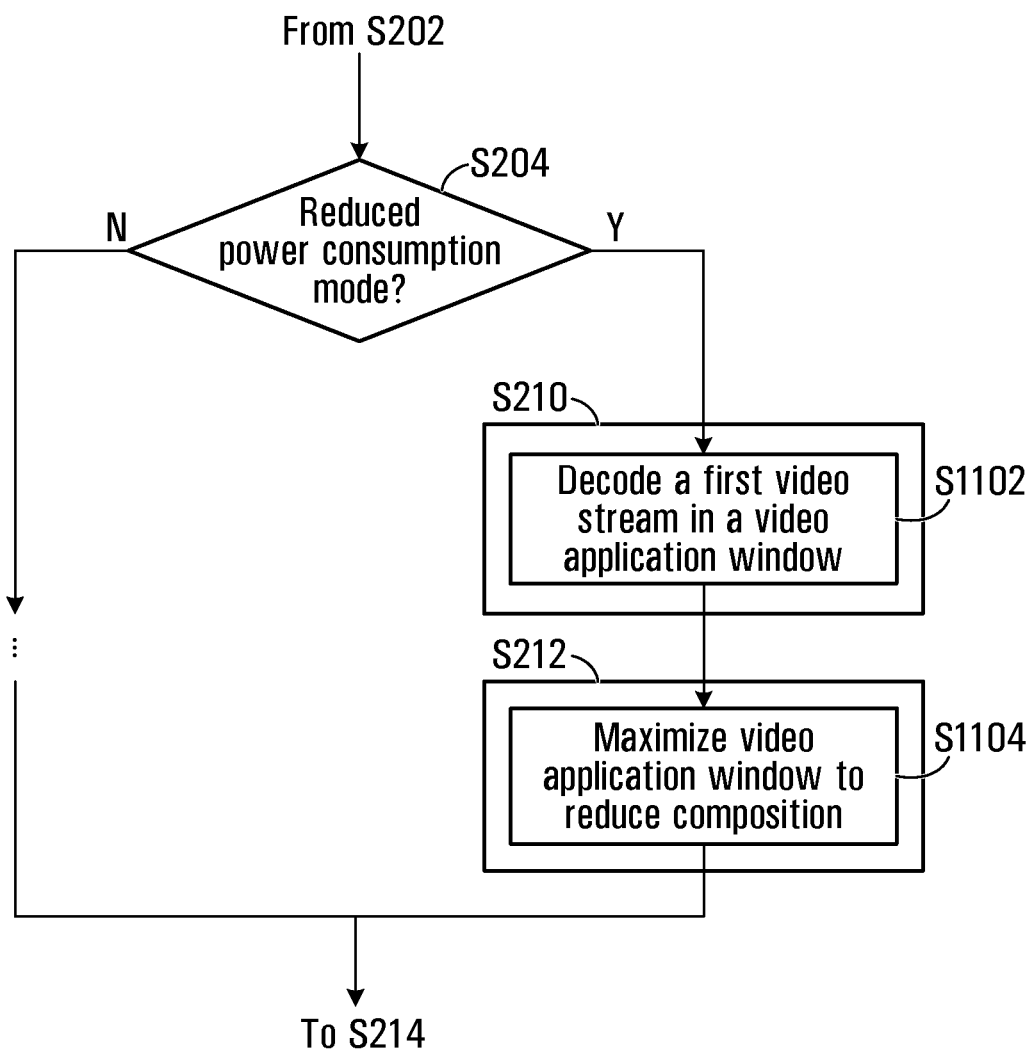
FIG. 8 is a flowchart of the actions of an exemplary device decoding video for display using a video application window on a computer.

In yet another embodiment of the present invention, device 100, in the form of a computing device such as a laptop receiving an audio/video stream, may force a full screen video output on connected display 118, in response to reduced power mode detection. This allows processing engine 104 to avoid compositing the video player application with other applications and/or the desktop background on display 118, thereby helping to conserve power consumption. As depicted in FIG. 8, upon detection of a reduced power consumption mode (S1102), device 100 may decode a video stream (S1102) for display using a video application window on a computer (e.g., laptop). The application window may be maximized (S1104) to display the window without any composition with other windows or the desktop. The application with a maximized window may have exclusive access to the display screen, so that no composition is taking place in the background. For example, the DirectX application programming interface (API) includes options that provide full screen exclusive mode access to the frame buffer to a client application in a computer. Thus in step S1104 the video application may utilize full screen exclusive mode access to the frame buffer, to present maximized images while blocking other application from presenting images for composition or display. Of course, in normal power consumption mode, the video application window may be composited with other application windows and the composited output image may be displayed. Processing engine 104 may continue to decode and output an audio stream in the same manner in both normal and reduced power consumption modes.

Figure 9:
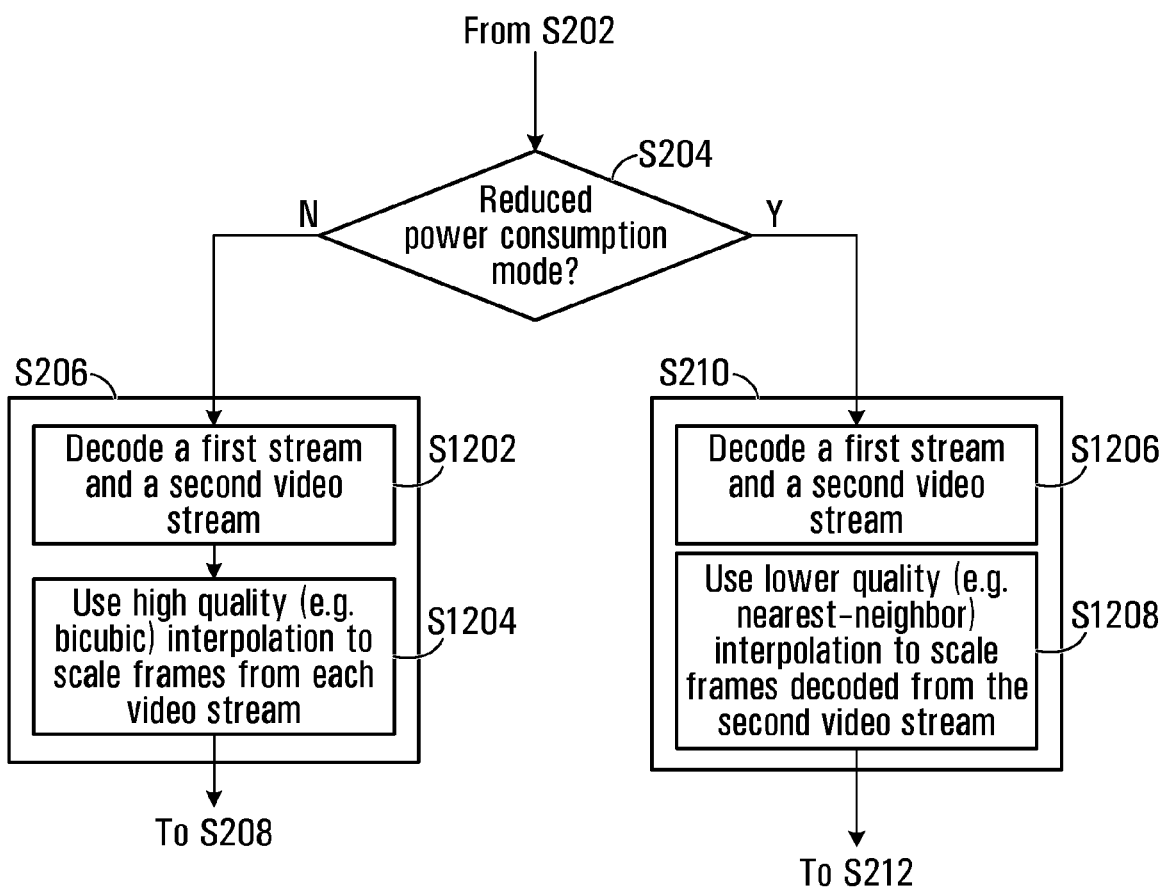
FIG. 9 is a flowchart of the actions of an exemplary device processing multi-stream video, depicting the use of simpler processing algorithms when in reduced power consumption mode, to conserve power.

In yet another embodiment, processing engine 104 may perform various audio/video processing tasks using computationally more demanding higher quality algorithms and parameters on at least a first and second audio/video streams during normal power consumption mode. Upon detecting a reduced power consumption mode however, processing engine 104 may utilize simpler algorithms and/or parameters which are computationally simpler, but may lead to a lower quality output on the second video stream. As depicted in flowchart of FIG. 9, device 100 may for example, decode and scale frames of the second stream, depending on the power consumption mode. Upon detection of a reduced power consumption mode (S204), lower order filtering or a simple scaling algorithm (e.g., nearest neighbor interpolation) may be used (S1208) after decoding the second stream (S1206). However in a normal mode, higher order filters such as a more complex interpolation (e.g., bicubic) or may be used, (S1204) for scaling and other processing, after decoding (S1202) the second stream. In both power consumption modes, the first stream may be digitally processed in the same manner, using higher order filters, more complex interpolation, or other more complex higher quality algorithms.

In addition, in one variation of the above embodiment, a computationally complex algorithm such as inverse telecine may be used for frame rate conversion in normal power consumption mode. However computationally simpler algorithms may be used when in reduced power consumption mode to digitally process the second stream. For example, inverse telecine operations on the second stream may be dropped altogether when in a reduced power consumption mode.

In these embodiments IG and/or PG streams may be treated as the first stream—in a conventional manner.

In other embodiments, multiple streams may be multiplexed and received over a data network, over a cable television network, over a satellite network, as part of a terrestrial television transmission, from a disk drive, or from some other data source.

Further, one or more of de-noise, scaling, frame rate conversion, gamma correction, or de-interlacing operations may be operated with lower quality parameters or using simpler algorithm on one of the two streams to reduce computation and thus to ultimately limit power consumption. For example, in a reduced power consumption mode, inverse telecine operations may be discarded during frame rate conversion.

In a variation of the above embodiment, device 100 may decode a main video stream (e.g., primary stream in BD) and only some of the auxiliary streams (e.g., only IG or only PG in BD) when in a reduced power consumption mode, to fine tune power consumption/conservation. Specifically, device 100 which may be a battery operated laptop for example, may have two reduced power consumption modes in which the first reduced power consumption mode is entered when the energy level of the power source (e.g. battery level) P is below a first threshold $\epsilon_1$ but above a second threshold $\epsilon_2$ which is lower than the first threshold. That is, the first reduced power consumption mode is entered when $\epsilon_2 < P < \epsilon_1$. Device 100 may enter a second reduced power consumption mode when its battery level P has fallen to or below the second threshold (i.e., when $P \leq \epsilon_2$).

Figure 10:
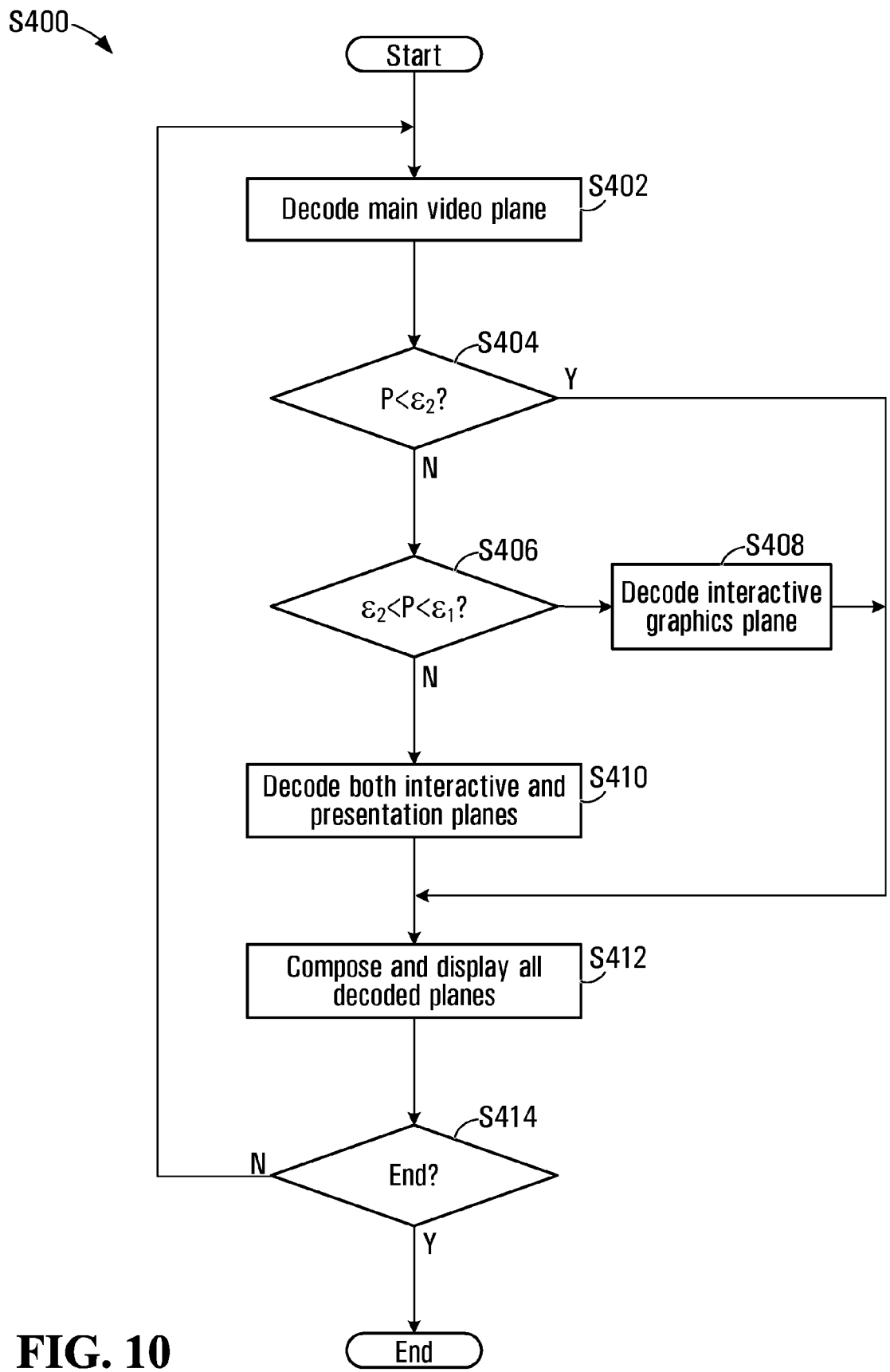
FIG. 10 is a flowchart depicting exemplary steps performed by an exemplary device having at least two lower power consumption modes, to decode and display multi-stream audio/video.

As shown in steps S400 in FIG. 10, in this embodiment, device 100 always decodes the main or primary video stream (S402). If the battery level P is below the second threshold $\epsilon_2$, then device 100 is in a second power consumption mode and only the main video frame is displayed (S412).

However, if the battery level P is above second threshold $\epsilon_2$ but below the first threshold $\epsilon_1$ (S406),—i.e., $\epsilon_2 < P < \epsilon_1$—then device 100 is in its first reduced power consumption mode, and decodes one auxiliary stream (S408) (e.g., the IG stream).

If the battery level P is above the first threshold $\epsilon_1$, (that is, $P > \epsilon_1$) then device 100 is in a normal power consumption mode, and decodes more of its auxiliary streams (e.g., decodes both the interactive graphics stream and the presentation graphics stream) in addition to the main video stream; and composites the decoded main and interactive images together to form and display the final image (S410).

In normal power consumption mode and the first reduced power consumption mode, the decoded images are combined or composited and displayed (S412). In the second reduced power consumption mode, composition is not required as only the main video frame is displayed. If more video and graphics stream data remain (S414) the process starts again (S402).

It is easy to see that above embodiment may be generalized for N reduced power consumption modes corresponding to N threshold values ($\epsilon_1$, $\epsilon_2$, ... $\epsilon_N$ where $\epsilon_j < \epsilon_{j+1}$ for $1 \leq j < N$) associated with the power level in device 100, which may be used to provide flexible power management within device 100. For example, the secondary video stream in Blu-ray discs may be easily accommodated in this scheme.

Of further interest, one or more thresholds c may be computed dynamically—for example, in dependence on the energy required to decode one or more streams to be listened to by a user for the remaining time of a particular stream (e.g. for the remaining time of a feature or movie, as for example carried by the primary stream) being viewed or listened to. Remaining time may be extracted from the video or auxiliary stream in a conventional manner. The energy required to view or listen to the remainder of the stream may be computed as the product of the average amount of power per unit time consumed while decoding one or more streams, times the remaining time. Further thresholds may be computed assuming various combinations of decoding techniques for the multiple streams—e.g. assuming fewer streams are decoded, or multiple streams are decoded in a modified manner to reduce dynamic power consumption, while allowing the stream of interest to be viewed or listened to. If a threshold $\epsilon_{FEATURE}$ is determined for which the entire or remainder of the feature can be viewed or listened to for an available energy level P of the power source (e.g. battery), streams may be decoded using the associated combination of decoding techniques for the streams. In this way, a lower power mode may be assumed in order to ensure that a particular stream may be decoded (i.e. viewed/listened to) to completion using available power.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of processing audio/video data from a multi-stream audio/video source at an audio/video device to output audio/video in one of at least two power consumption modes, said audio/video data comprising a first digital audio/video stream and a second digital audio/video stream, said method comprising:

(i) in a first normal power consumption mode, compositing images of a first sequence of decoded images with images of a second sequence of decoded images to produce output audio/video frames, wherein said first sequence of decoded images is formed by digitally processing said first digital stream and said second sequence of decoded images is formed by digitally processing said second digital stream to output audio/video;

(ii) detecting a desired reduced power consumption mode for operating said device; and (iii) in response to said detecting:
  continuing decoding and digitally processing said first digital stream as in the first normal power consumption mode to produce said first sequence of decoded images;
  producing a third sequence of decoded images by digitally processing and decoding said second stream in a computationally simpler manner than in the first normal power consumption mode to reduce power consumption,
  said digitally processing and decoding in said computationally simpler manner comprising at least one of:
    decoding only a subset of overlay images from said second stream;
    performing lower order filtering on said second stream than in the first normal power consumption mode;
    performing lower quality interpolation on said second stream than in the first normal power consumption mode;
    performing nearest neighbor interpolation on said second stream;
    inhibiting inverse telecine operations on said second stream; and
    performing one of: de-noising, scaling, frame rate conversion, gamma correction, and de-interlacing operations on said second stream in a computationally simpler manner than in the first normal power consumption mode; and
  transitioning said device to composite images of said first sequence of decoded images, produced as in the first normal power consumption mode, with images of the third sequence of decoded images, produced in the computationally simpler manner, to produce output audio/video frames, wherein said third sequence of decoded images differs from said second sequence of decoded images.

2. The method of claim 1, wherein said first stream is a main video stream, and said second stream is a picture-in-picture video stream.

3. The method of claim 1, wherein said first stream comprises the primary video stream in Blu-ray, and said second stream comprises one of: the secondary video stream, the presentation graphics stream, the interactive graphics stream and the background stream in Blu-ray.

4. The method of claim 1, wherein said video data comprises a third stream, said method further comprising:
  decoding said third stream to form additional images, and in said normal power consumption mode, forming said output video by combining corresponding ones of said video frames and images from said first, second and third streams respectively; and upon detecting further limited available power for operating said device, combining and displaying corresponding ones of said video frames and images from said first and third streams but not said second stream.

5. The method of claim 1, further comprising:

upon receiving user input to invoke a menu while in said normal power consumption mode, displaying a menu while outputting said video frames, and upon receiving user input to invoke a menu while in said reduced power consumption mode, pausing output of said video frames at a current frame; and displaying said menu over said current frame.

6. The method of claim 1, further comprising:

upon receiving user input to invoke a menu while in said normal power consumption mode, displaying a menu while outputting said video frames, and upon receiving user input to invoke a menu while in said reduced power consumption mode, stopping output of said video frames; and displaying said menu without composition with any of said video frames.

7. The method of claim 1 further comprising:

in said reduced power consumption mode, decoding and outputting a fewer number of PCM channels than in said normal power consumption mode.

8. The method of claim 1, further comprising:

in said normal power consumption mode, decoding and down-mixing surround sound encoded channels, and in said reduced power consumption mode, decoding and selectively outputting only a subset of said surround sound channels.

9. The method of claim 1, further comprising determining at least one threshold of available energy of a power supply for said device to transition from said first normal power consumption mode to said reduced power consumption mode.

10. The method of claim 9, wherein said determining comprises calculating energy to be consumed in said first normal power consumption mode and in said reduced power consumption mode, and transitioning to said reduced power consumption mode when energy level of the power supply is less than the energy consumed to be consumed in said first normal power mode.

11. The method of claim 10, wherein said calculating energy is calculated in dependence on the length of time of said first stream to be decoded.

12. The method of claim 11, wherein said first stream contains a feature to be viewed or listened to, to completion, by a user.

13. A computing device for playing video data comprising a plurality of video streams from a source, said device comprising: at least one processing engine, memory storing processor executable instructions in communication with said processing engine and an output interface interconnected to a display; said instructions adapting said device to:

in a normal power consumption mode, decode and digitally process at least a first stream to form a first sequence of images and decode and digitally process a second stream using a first algorithm to form a second sequence of images, and composite images of said first sequence of images with images of said second sequence of images to form output video frames;

in a reduced power consumption mode, decode said second stream to form a third sequence of images using a second algorithm that is computationally simpler than said first algorithm in order to reduce dynamic power consumed by said device to utilize reduced power consumption processing, while continuing decoding and digitally processing said first stream in the same manner as in said normal power consumption mode, the processing and digitally decoding of said second stream comprising at least one of:

decoding only a subset of overlay images from said second stream;

performing lower order filtering on said second stream than in the normal power consumption mode;

performing lower quality interpolation on said second stream than in the normal power consumption mode;

performing nearest neighbor interpolation on said second stream;

inhibiting inverse telecine operations on said second stream; and performing one of: de-noising, scaling, frame rate conversion, gamma correction, and de-interlacing operations on said second stream in a computationally simpler manner than in the normal power consumption mode; and transition to composite images of said first sequence of images, produced as in the normal power consumption mode, with images of said third sequence of images produced computationally simpler to form output video frames.

14. The device of claim 13, wherein said instructions adapt said device to scale said output video frames, said first algorithm comprises higher order filtering and said second algorithm comprises lower order filtering.

15. The method of claim 13, wherein said instructions adapt said device to perform one of de-noising, scaling, frame rate conversion, gamma correction, and de-interlacing on said output video frames; said first algorithm comprises a computationally complex algorithm; and said second algorithm involves a computationally simpler algorithm.

16. A video player device operable in at least two power consumption modes, for digitally processing and outputting audio/video data from a multi-stream source comprising a plurality of audio/video streams each containing a sequence of images, said device comprising:

(i) a reader for reading a medium containing said plurality of streams;

(ii) a processing engine in communication with memory and said reader; said memory containing processor executable instructions for decoding and processing said streams;

wherein, in a first normal power consumption mode, said device digitally processes at least a first and a second one of said plurality of streams to form a first sequence of images from said first one of said plurality of streams and a second sequence of images from said second one of said plurality of streams and composites images from said first sequence of images with images from said second sequence of images to form output video frames; and in response to detecting a desired second reduced power consumption mode, said device selects a computationally simpler manner to digitally process said second one of said streams and forms a third sequence of images from said second one of said plurality of streams by digitally processing said second one of said streams in said computationally simpler manner, in order to reduce dynamic power consumed by said device as a result of digitally processing said second one of said plurality of streams, while continuing said digitally processing said first one of said plurality of streams in the same manner as in said first normal power consumption mode, wherein said digitally processing said second stream in said computationally simpler manner comprises at least one of:

decoding only a subset of overlay images from said second stream:

performing lower order filtering on said second stream than in the first normal power consumption mode;

performing lower quality interpolation on said second stream than in the first normal power consumption mode;

performing nearest neighbor interpolation on said second stream;

inhibiting inverse telecine operations on said second stream; and performing one of: de-noising, scaling, frame rate conversion, gamma correction, and de-interlacing operations on said second stream in said computationally simpler manner than in the first normal power consumption mode;

and transitions to composites images from said first sequence of images, produced as in the first normal power consumption mode with images from said third sequence of images, produced in the computationally simpler manner to form output video frames.

17. The device of claim 16, wherein said processing engine comprises a processor in communication with a graphics processing unit (GPU).

18. The device of claim 16, wherein said player is a Blu-ray player and said medium is a Blu-ray disc.

19. The device of claim 17, further comprising user interface software executing on said processing engine, wherein said device selectively designates one of said plurality of streams as said first stream, and another one of said plurality of streams as said second stream, in dependence on user input via said user interface software.

20. The device of claim 16, wherein said processing engine comprises at least one of a host processor, a graphics processor and an audio processor.

* * * * *